US012600245B2

(12) United States Patent
Fujita et al.

(10) Patent No.: US 12,600,245 B2
(45) Date of Patent: Apr. 14, 2026

(54) POWER CONTROL APPARATUS FOR VEHICLE

(71) Applicant: HONDA MOTOR CO., LTD., Tokyo (JP)

(72) Inventors: Yuji Fujita, Tokyo (JP); Yu Yamamoto, Tokyo (JP); Atsushi Saito, Tokyo (JP); Keita Kishi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 401 days.

(21) Appl. No.: 18/190,048

(22) Filed: Mar. 24, 2023

(65) Prior Publication Data

US 2023/0311675 A1 Oct. 5, 2023

(30) Foreign Application Priority Data

Mar. 31, 2022 (JP) ................................. 2022-059941

(51) Int. Cl.
 B60L 50/60 (2019.01)
 B60L 3/04 (2006.01)
 (Continued)

(52) U.S. Cl.
 CPC ................. B60L 50/60 (2019.02); B60L 3/04 (2013.01); B60L 58/26 (2019.02); B60L 3/0046 (2013.01);
 (Continued)

(58) Field of Classification Search
 CPC .......... B60L 50/50; B60L 50/60; B60L 50/61; B60L 50/62; B60L 58/10; B60L 58/24;
 (Continued)

(56) References Cited

U.S. PATENT DOCUMENTS

| | | | |
|---|---|---|---|
| 5,929,609 | A | 7/1999 | Joy et al. |
| 9,893,394 | B2 | 2/2018 | Shin et al. |

(Continued)

FOREIGN PATENT DOCUMENTS

| | | |
|---|---|---|
| CN | 101741126 A | 6/2010 |
| CN | 106058360 A | 10/2016 |

(Continued)

OTHER PUBLICATIONS

Office Action issued Jun. 27, 2025 in the U.S. Appl. No. 18/190,141.

(Continued)

*Primary Examiner* — Ramya P Burgess
*Assistant Examiner* — Sara J Lewandroski
(74) *Attorney, Agent, or Firm* — CKC & Partners Co., LLC

(57) ABSTRACT

An IPU includes a battery that supplies power to a drive unit of a vehicle, a temperature sensor that detects temperature of the battery, a current sensor that detects electrical current of the battery, a voltage sensor that detects voltage of the battery, contactors that cut off the electrical current flow from the battery and the electrical current flow to the battery, and a battery ECU that, when a temperature detection function by the temperature sensor has been lost, calculates a value of the power of the battery based on a detection result of the electrical current and a detection result of the voltage, and operates the contactors when a calculated value of the power exceeds a predetermined value for a predetermined period of time to cut off the electrical current flow from the battery and the electrical current flow to the battery.

1 Claim, 2 Drawing Sheets

(51) Int. Cl.
B60L 58/26 (2019.01)
B60L 3/00 (2019.01)

(52) U.S. Cl.
CPC ....... *B60L 3/0069* (2013.01); *B60L 2240/545* (2013.01); *B60L 2240/547* (2013.01); *B60L 2240/549* (2013.01)

(58) Field of Classification Search
CPC ................. B60L 58/26; B60L 2240/54; B60L 2240/545; B60L 2240/547; B60L 2240/549; B60L 3/0023; B60L 3/0046; B60L 3/0069; B60L 3/04
See application file for complete search history.

(56) References Cited

U.S. PATENT DOCUMENTS

| | | | | |
|---|---|---|---|---|
| 10,396,570 | B2 | 8/2019 | Loncarevic | |
| 11,442,110 | B2 | 9/2022 | Talukdar et al. | |
| 2009/0088993 | A1* | 4/2009 | Oohasi | B60L 3/0092 |
| | | | | 702/63 |
| 2010/0033135 | A1* | 2/2010 | Nishida | H01M 10/443 |
| | | | | 320/136 |
| 2012/0016547 | A1* | 1/2012 | Aridome | B60L 58/14 |
| | | | | 180/65.265 |
| 2013/0179012 | A1 | 7/2013 | Hermann et al. | |
| 2016/0301114 | A1 | 10/2016 | Izumi et al. | |
| 2019/0252906 | A1 | 8/2019 | Kusumi | |
| 2022/0289030 | A1* | 9/2022 | Pressman | H01M 10/625 |
| 2023/0311675 | A1 | 10/2023 | Yuji et al. | |

FOREIGN PATENT DOCUMENTS

| | | | | | |
|---|---|---|---|---|---|
| CN | 110228369 | A | * | 9/2019 | B60L 58/10 |
| CN | 112078366 | A | | 12/2020 | |
| CN | 112140888 | A | | 12/2020 | |
| CN | 113071369 | A | * | 7/2021 | B60L 58/10 |
| JP | 2012168112 | A | | 9/2012 | |
| JP | 2019140827 | A | | 8/2019 | |
| JP | 2021007281 | A | | 1/2021 | |

OTHER PUBLICATIONS

Office Action issued Mar. 18, 2025 in the U.S. Appl. No. 18/190,141.
Office Action issued Nov. 28, 2025 in the CN Patent Application No. 202310255645.9.
Office Action issued Dec. 3, 2025 in the CN Patent Application No. 202310274758.3.

* cited by examiner

START

NO / TEMPERATURE DETECTION FUNCTION LOSS DETERMINATION STEP \ ~S1

YES

NO / HIGH-VOLTAGE CUTOFF DETERMINATION STEP \ ~S2

YES

HIGH-VOLTAGE CUTOFF STEP ~S3

END

BATTERY TEMPERATURE
80℃ BALANCE

HIGH-VOLTAGE
CUTOFF 0A                    60A          ELECTRICAL
                                   CURRENT

OUTPUT : 12kW

POWER CONTROL APPARATUS FOR VEHICLE

This application is based on and claims the benefit of priority from Japanese Patent Application No. 2022-059941, filed on 31 Mar. 2022, the content of which is incorporated herein by reference.

BACKGROUND OF THE INVENTION

Field of the Invention

The present invention relates to a power control apparatus for a vehicle.

Related Art

In recent years, research and development have been conducted on batteries that contribute to increased efficiency in energy in order to ensure access for more people to energy which is affordable, reliable, sustainable and advanced.

For example, a power control apparatus has been disclosed for a vehicle to which a battery is mounted, which monitors a temperature rising rate of an electric conduction component by a temperature sensor, and when the temperature rising rate of the current-carrying component exceeds a reference value, performs predetermined control (See, for example, Japanese Unexamined Patent Application, Publication No. 2019-140827.). According to this power control apparatus, the battery can be charged even when the temperature rising rate of the current-carrying component exceeds the reference value.

Patent Document 1: Japanese Unexamined Patent Application, Publication No. 2019-140827

SUMMARY OF THE INVENTION

However, protocols relating to an excessive temperature rise of the battery have been newly set in the vehicle safety level (ASIL: Automotive Safety Integrity Level), and now it is necessary to detect an excessive temperature rise of the battery and protect the battery even when the temperature detection function has been lost. Due to such a situation, in a vehicle equipped with a conventional power control apparatus, when the temperature detection function is lost, it is necessary to stop the charging of the battery, and it is necessary to stop driving of the vehicle.

The present invention has been made in view of the above situation, and an object of the present invention is to provide a power control apparatus for a vehicle capable of continuing charging of a battery or driving of a vehicle even when a temperature detection function is lost.

(1) A power control apparatus (for example, the IPU 3 to be described later) for a vehicle (for example, a vehicle 1 to be described later) according to an embodiment of the present invention includes: a battery (for example, a battery 30 to be described later) that supplies power to a drive unit (for example, a drive unit 2 to be described later) of a vehicle; a temperature sensor (for example, a temperature sensor 31 to be described later) that detects temperature of the battery; a current sensor (for example, a current sensor 33 to e described later) that detects electrical current of the battery; a voltage sensor (for example, a voltage sensor 32) that detects voltage of the battery; a cutoff element (for example, contactors 34*b* and 34*c*) that cuts off a flow of electrical current from the battery and a flow of electrical current to the battery and a controller (for example, a battery ECU 35 to be described later) that, when a temperature detection function of the temperature sensor has been lost, calculates a value of the power of the battery based on a detection result of the electrical current by the current sensor and a detection result of the voltage by the voltage sensor, and operates the cutoff element when a calculated value of the power exceeds a predetermined value for a predetermined period of time to cut off the flow of electrical current from the battery and the flow of electrical current to the battery.

According to the first aspect of the power control apparatus of the vehicle of the invention, the controller calculates the value of the power of the battery based on the detection result of the electrical current by the current sensor and the detection result of the voltage by the voltage sensor when the temperature detection function of the temperature sensor has been lost, and when the calculated value of the power exceeds a predetermined value for a predetermined period of time period, operates the cutoff element to cut off the flow of electrical current from the battery and the flow of electrical current to the battery. With such a configuration, even when the temperature detection function of the temperature sensor has been lost, it is possible to prevent an excessive temperature rise of the battery, and thus, it is not necessary to stop the charging of the battery or the driving of the vehicle in order to avoid the excessive temperature rise. Therefore, according to the first aspect of the power control apparatus for a vehicle of the invention, it is possible to continue charging of the battery and driving of the vehicle even when the temperature detection function has been lost.

According to the second aspect of the invention, the power control apparatus for a vehicle in the first aspect of the invention further includes a cooler (for example, an unillustrated water cooling mechanism to be described later) that cools the battery, in which the predetermined value and the predetermined period of time are set based on a heat generation characteristic of the battery and a cooling characteristic of the cooler.

According to the power control apparatus for a vehicle of the second aspect of the invention, since the predetermined value and the predetermined period of time serving as conditions for operating the cutoff element are set based on the heat generation characteristic of the battery and the cooling characteristic of the cooler, it is possible to reliably prevent an excessive temperature rise of the battery.

According to an embodiment of the present invention, it is possible to provide a power control apparatus for a vehicle capable of continuing charging of a battery or driving of a vehicle even when a temperature detection function has been lost. Thus, the present invention contributes to energy efficiency.

DETAILED DESCRIPTION OF THE INVENTION

An embodiment of the present invention will now be described in detail with reference to the accompanying drawings.

Figure 1:
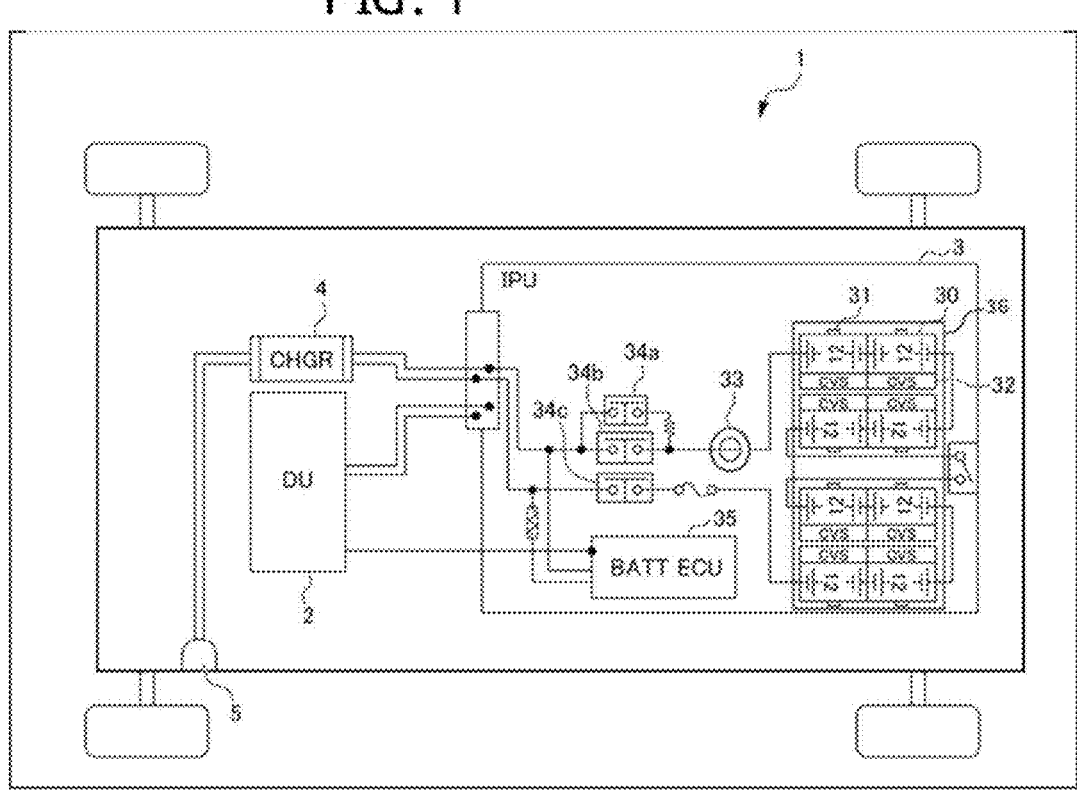
FIG. 1 is a schematic diagram showing a configuration of a vehicle equipped with an IPU according to an embodiment of the present invention.

First, a configuration of a vehicle 1 equipped with an IPU (Intelligent Power Unit) 3 according to an embodiment of the present invention will be described with reference to FIG. 1. FIG. 1 is a schematic diagram showing a configuration of the vehicle 1 equipped with the IPU 3 according to an embodiment of the present invention.

As shown in FIG. 1, the vehicle 1 includes a drive unit 2, the IPU 3, a charger 4, a plug 5, and the like. That is, the vehicle 1 of the present embodiment is a plug-in hybrid vehicle.

The drive unit 2 runs the vehicle 1 using power supplied from the IPU 3. The drive unit 2 includes, for example, an engine and a motor as a power source, and a FI-ECU and a PCU which control the engine and the motor.

The IPU 3 includes a battery pack for driving the drive unit 2, and functions as a power control apparatus for the vehicle 1. Specifically, the IPU 3 includes a plurality of batteries 30, a plurality of temperature sensors 31, a plurality of voltage sensors 32, a current sensor 33, a plurality of contactors 34a, 34b and 34c, a battery ECU 35, and a water cooling mechanism (not shown).

The battery 30 is a high-voltage battery that is charged by the charger 4 and supplies electric power to the drive unit 2 by discharging. The battery 30 of the present embodiment is, for example, a large-capacity battery in which a plurality of battery cells configured by lithium ion secondary batteries are connected in series.

The temperature sensor 31 functions as a temperature sensor that detects the temperature of the battery 30. In the present embodiment, a plurality of temperature sensors 31 are provided, for example, for each stack of a plurality of battery cells, and the temperature sensor 31 detects the temperature of each stack.

The voltage sensors 32 each function as a voltage sensor that detects the voltage of the battery 30. The voltage sensor 32 of the present embodiment is, for example, a CVS (Cell Voltage Sensor). The voltage sensor 32 is provided, for example, for each of a plurality of stacks included in the battery 30, and detects the voltage of each stack.

The current sensor 33 functions as a current sensor that detects the electrical current of the battery 30. The current sensor 33 of the present embodiment is, for example, an ISOC (I State of Charge) sensor.

The contactor 34a operates at the time of activation, and the contactors 34b and 34c operate at the time of vehicle travel, battery charging, or the like other than at the time of activation. The contactors 34b and 34c are respectively a positive contactor and a negative contactor, and cut off electrical current flow from the battery 30 and electrical current flow to the battery 30. That is, the contactors 34b and 34c cut off the supply of electric power from the battery 30 to the drive unit 2 at a high voltage, and cut off the supply of regenerative electric power from the drive unit 2 to the battery 30 at a high voltage. The contactors 34b and 34c cut off the supply of power from the charger 4, which is connected to an external power supply device (not shown) via the plug 5, to the battery 30 at a high voltage.

The battery ECU 35 integrally controls the IPU 3. The battery ECU 35 determines whether or not the temperature detection function by the temperature sensor 31 has been lost. When the temperature detection function is defective for some of the temperature sensors 31, the battery ECU 35 determines that the temperature detection function by the temperature sensors 31 is not missing, and uses the temperature detection function by the remaining temperature sensors 31. That is, the battery ECU 35 determines that the temperature detection function by the temperature sensor 31 has been lost when the temperature detection function is defective for all of the plurality of temperature sensors 31.

Specifically, when the detection value of the temperature sensor 31 is an abnormal value, the battery ECU 35 detects a failure of the temperature sensor 31, and determines that the temperature detection function of the temperature sensor 31 has been lost. Whether or not the detection value of the temperature sensor 31 is an abnormal value can be determined based on, for example, a charge/discharge history of the battery 30.

Further, when the temperature detection function by the temperature sensor 31 has been lost, the battery ECU 35 calculates a value of the power of the battery 30 based on the detection result of the electrical current by the current sensor 33 and the detection result of the voltage by the voltage sensor 32. When the calculated power value exceeds a predetermined value (for example, 12 kW) for a predetermined period of time (for example, 5 seconds), the battery ECU 35 operates the contactors 34b and 34c to cut off the current flow from the battery 30 and the current flow to the battery 30.

The battery ECU 35 controls the battery 30 so that the power of the battery 30 does not exceed the predetermined value (for example, 12 kW) regardless of whether or not the temperature detection function by the temperature sensor 31 is defective.

A predetermined value and a predetermined period of time, which are conditions under which the battery ECU 35 operates the contactors 34b and 34c, are appropriately set based on heat generation characteristics of the battery 30 and cooling characteristics of a water cooling mechanism (not shown). The predetermined value and the predetermined period of time will be described later in detail.

The charger 4 charges the battery 30 by being connected to an external power supply device (not shown) via the plug 5.

The water cooling mechanism (not shown) functions as a cooling means for cooling the battery 30 which generates heat. The water cooling mechanism is provided below the battery 30, for example, and cools the battery 30.

Figures 2, 3:
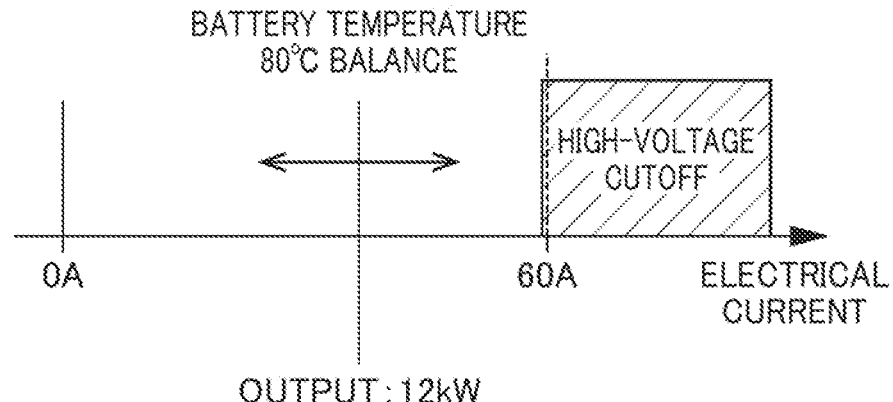
FIG. 2 is a flowchart illustrating high-voltage cutoff processing in the IPU.
FIG. 3 is a diagram showing an example of a value of electrical current serving as a condition for operating a contactor.

Next, with reference to FIG. 2, a description will be provided for high-voltage cutoff processing in the IPU 3. FIG. 2 is a flowchart illustrating the high-voltage cutoff processing in the IPU 3.

As shown in FIG. 2, the high-voltage cutoff processing in the IPU 3 includes a temperature detection function loss determination step S1, a high-voltage cutoff determination step S2, and a high-voltage cutoff step S3. The high-voltage cutoff processing in the IPU 3 starts together with the IG-ON of the vehicle 1.

In the temperature detection function loss determination step S1, the battery ECU 35 determines whether or not the temperature detection function by the temperature sensor 31 has been lost. When the temperature detection function by the temperature sensor 31 has been lost (YES in step S1), the processing advances to the high-voltage cutoff determination step S2. When the temperature detection function by the temperature sensor 31 has not been lost (NO in step S1), the temperature detection function lost determination step S1 is repeated.

In the high voltage cutoff determination step S2, the battery ECU 35 calculates the value of the power of the battery 30 based on the detection result of the electrical current by the current sensor 33 and the detection result of the voltage by the voltage sensor 32, and determines whether or not the calculated value of the power has exceeded a predetermined value (for example, 12 kW) for a predetermined period of time (for example, 5 seconds). When the value of the power calculated by the battery ECU 35 has exceeded the predetermined value for the predetermined period of time (YES in step S2), the processing advances to a high-voltage cutoff step S3. When the value of the power calculated by the battery ECU 35 has not exceeded the predetermined value (NO in step S2), the high-voltage cutoff determination step S2 is repeated.

In the high voltage cutoff step S3, the battery ECU 35 operates the contactors 34*b* and 34*c* to cut off the current flow from the battery 30 and the current flow to the battery 30 at a high voltage (for example, a voltage of 12 kW or more). After the cutoff, the processing ends.

Next, with reference to FIG. 3, a description will be provided for the value of electrical current serving as a condition for operating the contactors 34*b* and 34*c*. FIG. 3 is a diagram showing an example of electrical current values serving as conditions for operating the contactors 34*b* and 34*c*.

As shown in FIG. 3, the battery ECU 35 cuts off the battery 30 at a high voltage by cutting off electrical current of, for example, 60 A or more regardless of whether or not the temperature detection function by the temperature sensor 31 has been lost. With such a configuration, a value (for example, 12 kW) of electric power which serves as a safety upper limit temperature (for example, 80 degrees) at which continuous charge and discharge can be performed in an uncooled state is set to a predetermined value serving as a condition for operating the contactors 34*b* and 34*c*. In such a case, the predetermined period of time is set to 5 seconds.

According to the present embodiment, the following advantageous effects are achieved.

According to the IPU 3, when the temperature detection function by the temperature sensor 31 has been lost, the battery ECU 35 calculates the value of the power of the battery 30 based on the detection result of the electrical current by the current sensor 33 and the detection result of the voltage by the voltage sensor 32, and when the calculated value of the power exceeds a predetermined value for a predetermined period of time, the contactors 34*b* and 34*c* are operated to cut off the electrical current flow from the battery 30 and the electrical current flow to the battery 30 at a high voltage. With such a configuration, even when the temperature detection function of the temperature sensor 31 has been lost, the battery 30 can be prevented from being excessively heated, so that it is not necessary to stop the charging of the battery 30 or the driving of the vehicle 1 in order to avoid the excessive temperature rise. Therefore, according to the IPU 3 of the vehicle 1 according to the present embodiment, it is possible to continue the charging of the battery 30 and the driving of the vehicle 1 even when the temperature detection function is lost.

Further, according to the IPU 3, a predetermined value and a predetermined period of time serving as conditions for operating the contactors 34*b* and 34*c*, are set based on the heat generation characteristics of the battery 30 and the cooling characteristics of a water cooling mechanism (not shown). With such a configuration, according to the present embodiment, it is possible to reliably prevent an excessive temperature rise of the battery 30.

It should be noted that the present invention is not limited to the above embodiment, and that modifications, improvements, and the like are included in the present invention as long as the object of the present invention can be achieved.

For example, in the above embodiment, the present invention is applied to a plug-in hybrid vehicle. However, the present invention is not limited thereto. The present invention is widely applicable to vehicles including a high-voltage battery that supplies power to a drive unit of the vehicle.

EXPLANATION OF REFERENCE NUMERALS

1 vehicle
2 drive Unit
3 IPU (power control apparatus)
30 battery
31 temperature sensor
32 voltage sensor
33 current sensor
34*a*, 34*b*, 34*c*, contactor (cutoff element)
35 battery ECU (controller)
4 charger
5 plug
S1: temperature detection function loss determination step
S2 high-voltage cutoff determination step
S3 high-voltage cutoff step

What is claimed is:

1. A power control apparatus for a vehicle comprising:
a battery that supplies power to a drive unit of a vehicle;
a temperature sensor that detects temperature of the battery;
a current sensor that detects electrical current of the battery;
a voltage sensor that detects voltage of the battery;
a contactor that cuts off a flow of electrical current from the battery and a flow of electrical current to the battery and
a controller that, when a temperature detection function of the temperature sensor has been lost, calculates a value of the power of the battery based on a detection result of the electrical current by the current sensor and a detection result of the voltage by the voltage sensor, and operates the contactor when a calculated value of the power exceeds a predetermined value for a predetermined period of time to cut off flow of the electrical current from the battery and the flow of electrical current to the battery,
wherein the battery is cooled, and wherein the predetermined value and the predetermined period of time are set based on a heat generation characteristic of the battery and a cooling characteristic of a water cooling mechanism.

\* \* \* \* \*